US008928659B2

(12) United States Patent
Bar-Zeev et al.

(10) Patent No.: US 8,928,659 B2
(45) Date of Patent: Jan. 6, 2015

(54) TELEPRESENCE SYSTEMS WITH VIEWER PERSPECTIVE ADJUSTMENT

(75) Inventors: Avi Bar-Zeev, Redmond, WA (US); Christian F. Huitema, Clyde Hill, WA (US); Alex Aben-Athar Kipman, Redmond, WA (US); Robert L. Crocco, Jr., Seattle, WA (US); John Allen Tardif, Sammamish, WA (US); Eric G. Lang, Yarrow Point, WA (US)

(73) Assignee: Microsoft Corporation, Redmond, WA (US)

( * ) Notice: Subject to any disclaimer, the term of this patent is extended or adjusted under 35 U.S.C. 154(b) by 604 days.

(21) Appl. No.: 12/821,249

(22) Filed: Jun. 23, 2010

(65) Prior Publication Data
US 2011/0316853 A1 Dec. 29, 2011

(51) Int. Cl.
*G06T 17/00* (2006.01)
*G06F 3/033* (2013.01)
*G09G 5/08* (2006.01)
*G06T 15/20* (2011.01)
*H04N 7/14* (2006.01)
*G06F 3/14* (2006.01)

(52) U.S. Cl.
CPC ............... *G06T 15/20* (2013.01); *H04N 7/144* (2013.01); *G06F 3/1454* (2013.01); *G09G 2354/00* (2013.01)
USPC .......................................... 345/420; 345/158

(58) Field of Classification Search
None
See application file for complete search history.

(56) References Cited

U.S. PATENT DOCUMENTS

| | | | | |
|---|---|---|---|---|
| 6,806,898 B1 * | 10/2004 | Toyama et al. | ............ | 348/14.16 |
| 8,114,172 B2 * | 2/2012 | Givon | ............... | 48/49 |
| 8,175,374 B2 * | 5/2012 | Pinault et al. | ................ | 382/154 |
| 2003/0232648 A1 * | 12/2003 | Prindle | .......................... | 463/40 |
| 2006/0187297 A1 * | 8/2006 | Onural | ............................ | 348/40 |
| 2009/0169058 A1 * | 7/2009 | Chen | ............................ | 382/106 |
| 2009/0174713 A1 * | 7/2009 | Borshukov et al. | ........... | 345/426 |
| 2010/0295854 A1 * | 11/2010 | Miller | ............................ | 345/427 |
| 2010/0309286 A1 * | 12/2010 | Chen et al. | ....................... | 348/43 |
| 2011/0128555 A1 * | 6/2011 | Rotschild et al. | ............ | 356/625 |
| 2011/0310449 A1 * | 12/2011 | Kim et al. | .......................... | 359/9 |

FOREIGN PATENT DOCUMENTS

WO WO 2007135165 A1 * 11/2007

OTHER PUBLICATIONS

Peter Tsang, W.-K. Cheung, T.-C. Poon and C. Zhou, Holographic video at 40 frames per second for 4-million objects points, Aug. 1, 2011/ vol. 9, No. 16/ Optics Express 15205.*

* cited by examiner

*Primary Examiner* — Kee M Tung
*Assistant Examiner* — Frank Chen
(74) *Attorney, Agent, or Firm* — Steve Wight; Judy Yee; Micky Minhas

(57) ABSTRACT

Described herein is a telepresence system where a real-time a virtual hologram of a user is displayed at a remote display screen and is rendered from a vantage point that is different than the vantage point from which images of the user are captured via a video camera. The virtual hologram is based at least in part upon data acquired from a sensor unit at the location of the user. The sensor unit includes a color video camera that captures 2-D images of the user including surface features of the user. The sensor unit also includes a depth sensor that captures 3-D geometry data indicative of the relative position of surfaces on the user in 3-D space. The virtual hologram is rendered to orientate the gaze of the eyes of the virtual hologram towards the eyes of a second user viewing the remote display screen.

20 Claims, 8 Drawing Sheets

TELEPRESENCE SYSTEMS WITH VIEWER PERSPECTIVE ADJUSTMENT

BACKGROUND

Telepresence systems such as video conference systems and video chat systems allow users at remote locations to see and hear each other. Each location may include hardware such as video cameras, microphones, display screens, and speakers capable of capturing and transmitting visual and audio communications between the remote locations. Telepresence hardware may include customized conference rooms with multiple cameras (and viewing angles), microphones, and speaker systems. Telepresence systems may also be carried out using personal computer systems such as desktops, notebooks, and gaming consoles or other types of devices that are capable of capturing and transmitting video and audio signals.

When using a telepresence system, each user will typically face a local display screen in order to observer the video of the remote user. Simultaneously, a local video camera captures video of the local user and transmits the video to the display screen of the remote user. The video cameras capturing each user are typically positioned in locations other than where each user is looking (i.e. the center of the display screen). For example, on a laptop computer, the video camera may be located on the upper bezel of the LCD display of the computer. Because each user is typically looking at the middle of the LCD screen when communicating with another user, the video camera captures video of the user while the user is looking (i.e. gazing) in a direction below where the camera is positioned. When the remote user watches this video, the user being displayed in the transmitted video appears to be looking downwardly. Because each user perceives that the other remote user is not directly looking at them, the overall telepresence experience may feel unnatural compared to in-person direct eye to eye conversations.

SUMMARY

The following is a brief summary of subject matter that is described in greater detail herein. This summary is not intended to be limiting as to the scope of the claims.

Described herein are various technologies pertaining to capturing video in telepresence systems and in real-time, generating a virtual three-dimensional (3-D) hologram of users, and adjusting the virtual hologram based on the perspective desirable to the viewer of the virtual hologram.

Pursuant to an example, a telepresence system may have one or more sensor units capable of capturing color two-dimensional (2-D) video signals and depth signals representative of the 3-D geometry of the user (or other objects) captured in the 2-D video signals. Such a sensor unit can have a color video camera housed therein (e.g., a RGB camera) that captures the 2-D video signals of users and other objects in the field of view visible to the video camera. The same sensor unit or another sensor unit may have a depth sensor. An example depth sensor may include an infrared projector unit and a receiver unit. The receiver unit may, for example, correspond to a CCD operative to capture infrared light reflected off of users and other objects. Features of captured infrared light may be used to determine depth information (i.e. a 3-D spatial geometry) associated with the user and other objects in the field of view of the color video camera.

The 2-D video stream and 3-D depth information may be received by one or more applications executing in one or more processors of the telepresence system. A telepresence application may generate a 3-D model (e.g. a skinable skeleton) for the user from the 3-D depth information. This three-dimensional model may be continually updated to reflect movement of the user in real-time. The application may also extract the surface image data indicative of the visual appearance of the surface of the user from the 2-D video stream. The surface image-data may be continually extracted in real-time as the user moves and turns. Such surface image data may then be continually mapped to corresponding portions of the 3-D skeletal model to produce a virtual 3-D hologram of the user that moves and turns in real-time to match the user being captured by the sensor unit.

In real-time, a video stream of the virtual hologram may be generated from a vantage point (i.e. point of view) of a virtual camera that is located in a position that is different from the vantage point that the sensor unit originally captured the user. For example, the virtual camera may be positioned in a manner that produces a video stream from a perspective that the 3-D hologram would typically be looking (such as a position on a local display screen) when carrying out telepresence with a remote user. This generated video stream may then be displayed on the display screen of the remote telepresence user.

In this example, the virtual hologram of the user may appear on the display device of the remote user as facing and gazing outwardly in a direction perpendicular to the display device. However, it should be understood that the virtual camera may be positioned in other locations to orientate the virtual hologram to face in other directions as depicted on the display screen of the remote user. For example, the virtual camera position may be based on the relative location of the remote user with respect to the display screen of the remote user (or the location on the local display screen that depicts the remote user). In such an embodiment, the virtual hologram may be orientated so that when the local user chooses to look at the eyes of the remote user displayed on the local display screen, the eyes of the hologram when displayed on the display screen of the remote user appear to be correctly gazing at eyes of the remote user.

It should be appreciated that a single 2-D video camera captures images of only one side of the user. Thus, information regarding a back side of a user may not be available for mapping onto the 3-D skeletal model of the user. In such cases, the system may fill in unknown surfaces on the 3-D skeletal model with surface image data captured from the front side of the user. For example, the back of the head may be mapped with surface data corresponding to hair captured from the sides of the head of the user. Similarly, clothing color and textures from the sides of the user may be mapped to the back of the user.

In a further example, the system may be operative to cache previously mapped surface image data for later use when the corresponding side of the user may not be currently visible. For instance, as a user turns from side to side, surface image data captured from the 2-D color video camera may be stored in a data store in association with the corresponding location on the 3-D skeletal model to which the surface corresponds. When the video stream is generated from the 3-D skeletal model from a different vantage point (compared to the original vantage point of the sensor unit) surfaces of the user that are not currently being captured by the 2-D color video camera may be filled-in by mapping surface image data for those surface locations that are stored in the data store.

In an example embodiment, the system is operative to use the 3-D depth information to distinguish pixels in the 2-D color video of the user which correspond to the user and not the background. Thus, the system can extract surface data for the mapping to the 3-D model without using a green screen behind the user. In addition, it is to be appreciated that the system is operative to determine background portions of the 2-D color video that do not correspond to the user. Such background information may be replaced in the video stream of the virtual hologram of the user with an alternative background (which may be user selectable). Also, it should be appreciated that a persistent background model may be generated in real-time from current and cached 2-D images of the existing background of a user. This model of the existing background may then be included in the video stream of the virtual hologram.

Other aspects will be appreciated upon reading and understanding the attached figures and description.

DETAILED DESCRIPTION

Figure 1:
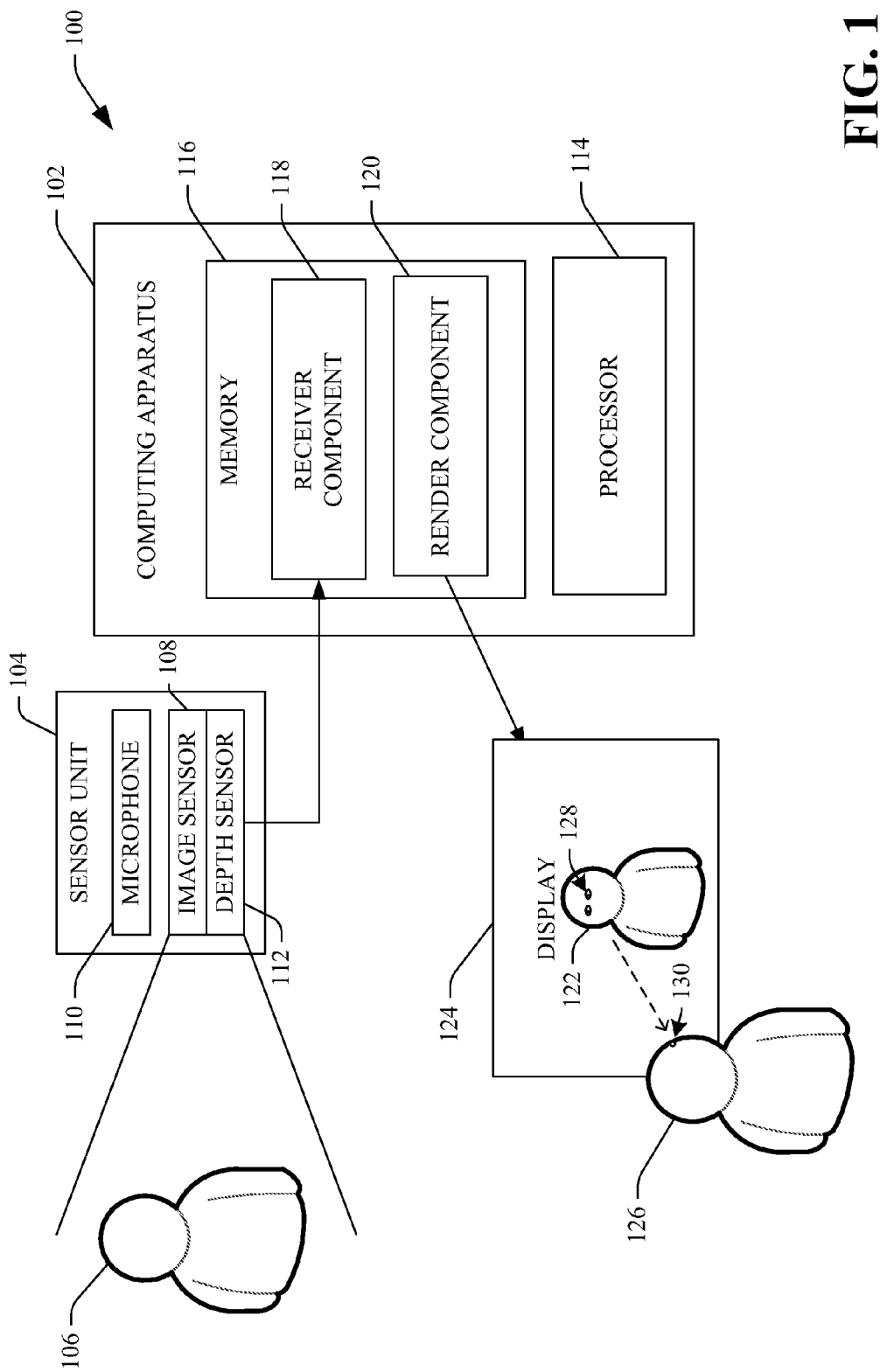
FIG. 1 is a functional block diagram of an exemplary system that facilitates telepresence with a virtual hologram of a user rendered with viewer perspective adjustment.

Various technologies pertaining to virtual holography with real time adjustment of viewer perspective will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an exemplary telepresence system 100 that facilitates rendering a virtual hologram on remote display in real-time from a different perspective than the perspective currently being captured of the user is illustrated. The system 100 includes at least one computing apparatus 102. Pursuant to an example, the computing device 102 may be a general purpose computer or set-top box of a video conference system that can be in communication with a display screen such as a computer monitor or television display. In another example, the computing apparatus 102 can be a video gaming console that can be in communication with a display screen. In yet another example, the computing apparatus 102 may be a mobile/portable gaming apparatus that comprises a display screen thereon. In still yet another example, the computing apparatus 102 can be a portable computing device that is not a dedicated gaming device such as a notebook computer, tablet computer, mobile telephone or multimedia apparatus. While examples of the telepresence system 100 described herein pertain to the telepresence environment (e.g. video conferences, remote chat, etc.), it is to be understood that technology described herein may also be applied to other environments such as a game or social media applications where an avatar/character of a user is desired to be displayed in a perspective different than the perspective from which a user is currently being imaged by the system.

The system 100 further comprises a sensor unit 104 that captures visual and audio information from a first user. The sensor unit 104 may be locally connected to the computing apparatus 102 via one or more interface cables. Also, the sensor unit may be connected via an intermediate computing apparatus that is operatively configured to communicate visual and audio information captured by the sensor unit 104 through a network to the computing apparatus 102 that is remotely located from the sensor unit 104. In still yet another example, the sensor unit 104 may be included in the computing apparatus 102 (e.g., included in the same housing that comprises a processor and memory of the computing apparatus).

The sensor unit 104 may be directed at user 106 to capture a digital representation of the user including real-time movements and actions of the user 106. Specifically, the sensor unit 104 can include an image sensor 108 such as a video camera that can capture color images of the user 106. The sensor unit 104 may also comprise a microphone 110 that is configured to capture audible output of the user 106. Additionally, the sensor unit 104 may further comprise a depth sensor 112 that is configured to sense a distance of the user 106 and/or certain portions of the user 106 from the sensor unit 104. The depth sensor 112 can project infrared light and detect reflectance of the infrared light to determine various distances from the sensor unit 104 to different parts of the individual 106. Of course, other technologies for performing depth sensing are contemplated and are intended to fall under the scope of the hereto-appended claims. For example, other types of depth sensors may employ other types of radiation (e.g. sound waves, laser light) to determine distances between portions of the body of the user and the sensor.

Pursuant to an example, the sensor unit 104 may be configured to output a continuous stream of data. Such data may include information captured by the depth sensor 112 that is indicative of a three-dimensional (3-D) geometry of the user. Such data may also include information captured by the image sensor 108 that corresponds to two-dimension (2-D) images of the user.

The computing apparatus 102 comprises at least one processor 114, which can be a general purpose processor, a graphical processing unit (GPU) and/or other suitable processor. The computing apparatus 102 also comprises memory 116 which includes various components that are executable by the processor 114. In an example, the memory 116 can include a receiver component 118 that receives data captured by the sensor unit 104.

The memory 116 may also include a render component 120 that causes a 3-D virtual hologram 122 (e.g., a 3-D virtual representation of the user 106) to be rendered in memory and included in a video stream displayed on a 2-D (or 3-D) display screen 124 based at least in part on the data received by the receiver component 118. Such a virtual hologram will correspond to a digitalized representative of the user 106 with surface features (i.e. skin, clothing) and a body structure that corresponds to that of the user. In an example, the virtual hologram is rendered based at least in part upon correlating corresponding portions of the 2-D image data and the 3-D geometry data in the input stream received by the receiver component 118 from the sensor unit 104. Also, as will be understood by one skilled in the art of graphical animation, the virtual hologram may be rendered through a rigging process that uses skeletal animation.

The display screen 124 may be a television display, wherein such television display is in communication with the computing apparatus 102. In another example, the display screen 124 may be a computer monitor or may be a display that is included in the computing apparatus 102 (e.g., when the computing apparatus 102 is a portable apparatus).

In an example, the render component 120 may generate a 3-D skeletal model in the memory based at least in part on the 3-D geometry data received from the depth sensor 112 of the sensor device 104. The render component 120 (or another component) may extract surface image data (e.g., depicting surface features such as skin and clothing) from the 2-D images of the user that correspond to surface locations on the 3-D skeletal model of the user. The render component 120 may then render portions of the video stream depicting the virtual hologram 122 such that surface image data of the user 106 from at least one current 2-D image is mapped to corresponding surface locations on the 3-D skeletal model.

The sensor unit 104 captures visual information of the user 106 from a vantage point (i.e., point of view) from where the video camera and depth sensor of the sensor unit are positioned relative to the user 106. For example, the sensor unit 104 may be located immediately below or above a local display screen (not shown) in front of the user 106. Also, in other examples, more than one sensor unit 104 may be positioned in various locations in a room to capture visual information of the user (or multiple users) from a plurality of different vantage points.

In a video conference or video chat application, the user 106 will typically gaze in a direction that is not directly toward the vantage point of a sensor unit. For example, rather than looking at the sensor unit 104, the user 106 may be looking towards the middle of a local display screen. Thus, from the vantage point of the sensor unit 104 positioned above the local display screen, the user 106 may appear to be looking downwardly, rather the directly into the image sensor 108 of the sensor unit 104. A remote user viewing a video stream from the image sensor 108 may regard the telepresence experience as being less natural compared to social interaction with the user in the same room.

To improve the telepresence experience, the render component 120 is configured (e.g. programmed) to render the virtual hologram 122 of the user (that is included in the video stream to the display 124) from at least one vantage point that is different than the at least one vantage point of the input stream received by the receiver component 118 from the sensor device 104.

For example, the render component 120 may render the video stream depicting the virtual hologram 122 from a vantage point based at least in part on a determined location of a portion of a user (e.g. the eyes, face, etc.) of a second user 126 relative to the display screen 124. In such an example, the render component 120 may render the virtual hologram 122 from a vantage point corresponding to this determined location). As a result, when the first user chooses to look at the eyes of the remote user (being displayed on a local display screen), the eyes 128 of the virtual hologram 122 when displayed on the display screen 124 are facing a determined location of eyes 130 of the second user 126.

In a further example, the render component 120 may render the video stream depicting the virtual hologram from two stereoscopic (i.e. spaced apart) vantage points capable of producing a 3-D image through a 3-D image displaying display screen (e.g. a 3-D capable television).

As can be appreciated, when one sensor unit is being used to capture a visual representation of the user 106, portions of the body of the user that are not in the field of view of the sensor unit 104 (e.g. the back and/or sides of the user) may not be included in the current stream of data from the video camera 108 and depth sensor 112. Thus, when the virtual hologram 122 of the user is rendered from a different point of view than the sensor unit 104, missing portions of the body of the user that are not being captured by the sensor unit 104 may need to be generated to include on the virtual hologram 122.

In an example, such missing portions of the body of the user 106 may be filled in by the render component 120 by stretching, hallucinating and/or interpolating known surface features (clothing color, skin color) included in surface image data being currently captured from the sensor device 104. In another embodiment, such missing portions may be filled in with other animated graphics such as a halo, a generic digital skin, or other visually appealing information.

Figure 2:
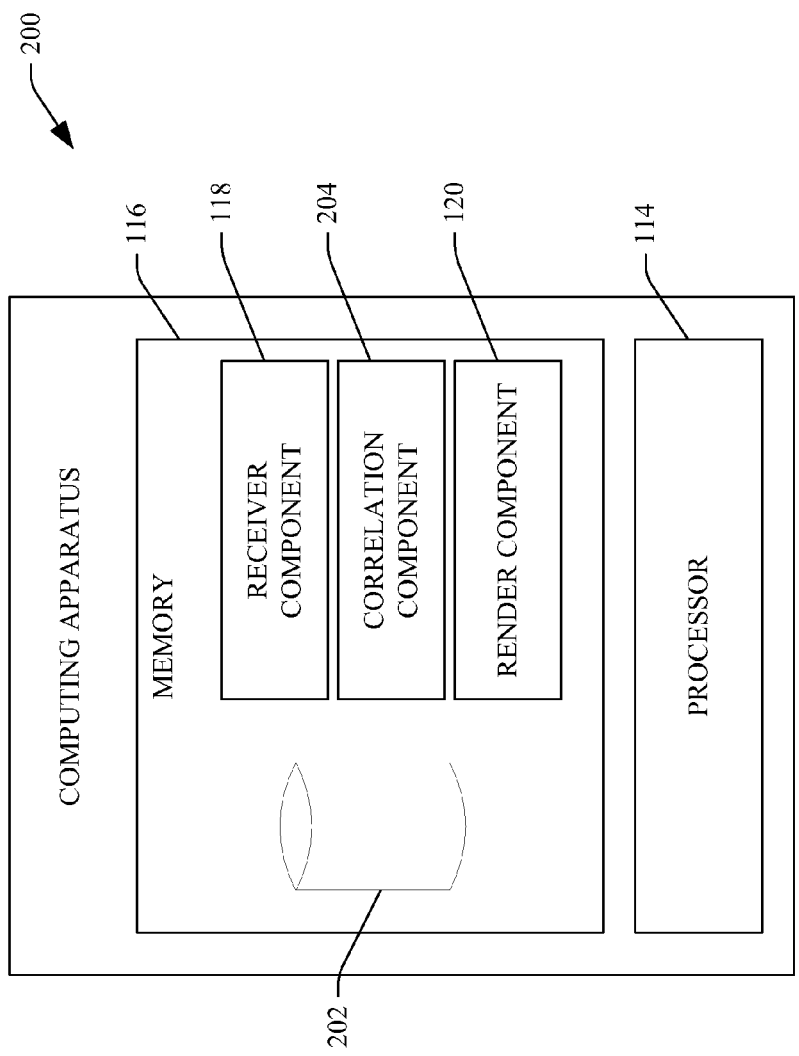
FIG. 2 is a functional block diagram of an exemplary system that facilitates mapping surface image data to a 3-D skeletal model from historically cached data.

Referring now to FIG. 2, in another example of a computing apparatus 200, the missing portions of the body of the user may be filled in using cached (i.e. historically saved) visual information that depicts the missing portions of the body of the user 106 (FIG. 1).

In this example, the computing apparatus 200 includes the processor 114 and the memory 116 as described above. In addition, the memory 116 of the computing apparatus 200 includes a data store 202 and a correlation component 204. In this example, the correlation component 204 may be configured to extract surface image data from the 2-D images of the user that correspond to surface locations on the 3-D skeletal model of the user. The correlation component 204 can then store in the data store 202, correlation data correlating surface image data of the user 106 extracted from the 2-D images to corresponding surface locations on the 3-D skeletal model of the user that is based at least in part upon the 3-D geometry data. Thus, as the user 106 turns and moves, the correlation component 204 can cause surface image data of the user 106 to be retained in correlation with appropriate surface locations on the 3-D skeletal model in the data store 202.

In general, surface locations on the 3-D skeletal model of the user that are available from current 2-D images of the user will be used to render as much of the virtual hologram as possible. However, further surface locations of the 3-D skeletal model of the user (rendered from a desired different vantage point) that are not depicted in at least one current 2-D image of the user can be mapped by the render component 120 to the 3-D skeletal model using surface image data retrieved from the data store 202 that was previously stored in correlated relation with the further surface locations of the 3-D skeletal model of the user.

Figure 3:
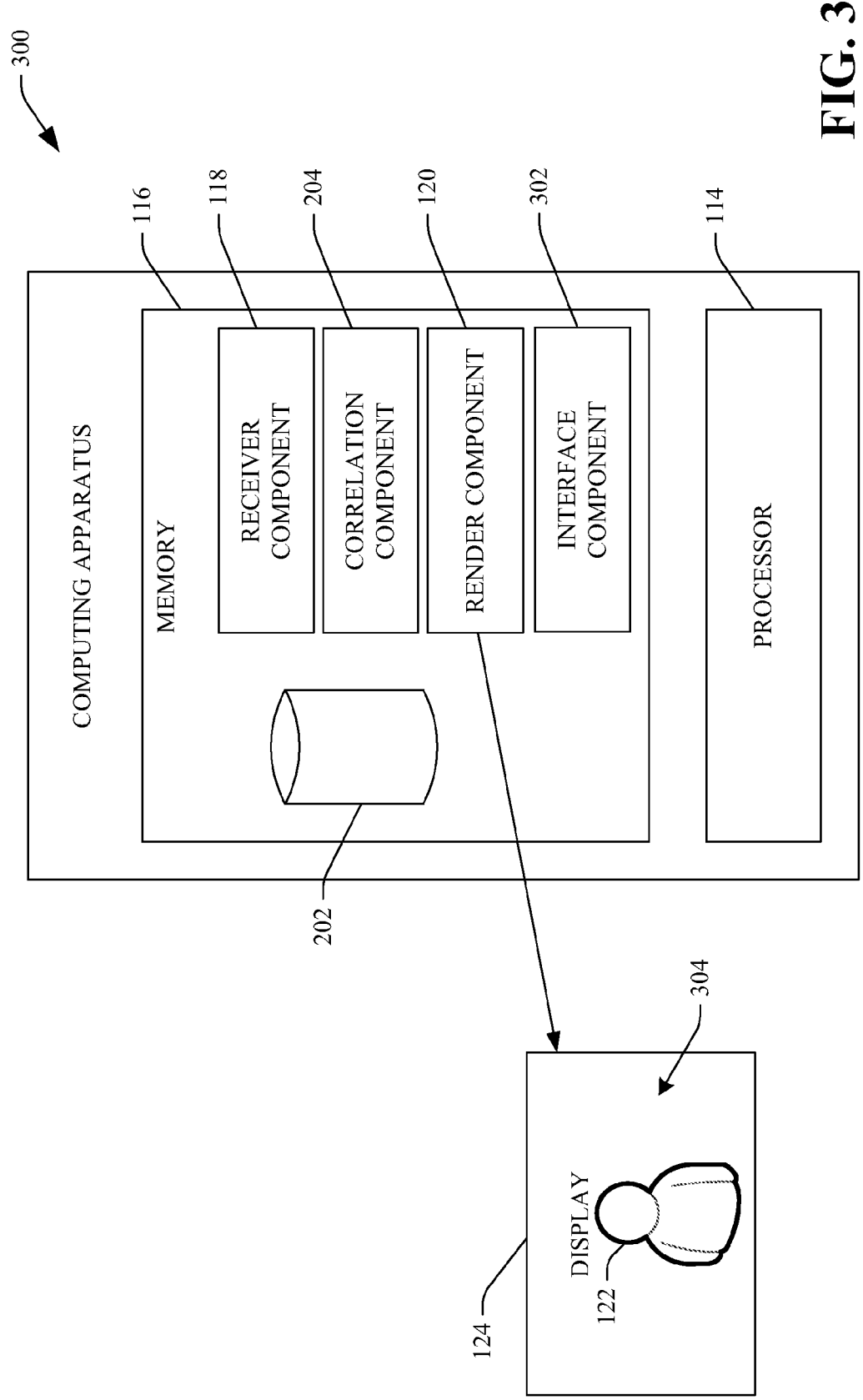
FIG. 3 is a functional block diagram of an exemplary system that facilitates user selections to render a virtual hologram.

Now referring to FIG. 3, another exemplary computing apparatus 300 is illustrated that is capable of providing local and/or remote users with the ability to customize the telepresence experience. In this example, the computing apparatus 300 includes the processor 114, the memory 116, and data store 202 as described above. In addition, the memory 116 of the computing apparatus 300 includes an interface component 302. The interface component 302 can allow an individual to modify how the render component generates the video stream for the display screen 124.

In this regard, it should be appreciated that the described system does not need to employ a green screen behind users to visually extract image data from users from background imaged data. For example, by extracting surface image data from 2-D images based on depth information that corresponds to the location of a user, image data corresponding to the body of the user can be extracted, which generally excludes image data for the background in the field of view of the sensor unit 104.

When rendering the virtual hologram on the display screen 124, the render component 120 may re-include background image data from the 2-D images that was not used to render the virtual hologram 122 for the background 304 on the display device 124. However, because the perspective of the user is modified, the system may generate a persistent model of the background that can be rendered for the video stream in a manner that is consistent with the vantage point used to render the virtual hologram. Such a persistent model of the background may be based on current and historically cached background data. Rather than using the original background, in an exemplary embodiment, the user interface component 302 can enable a user (through a suitable input device) of the computing apparatus 300 to selectively choose alternative background image data to use as the background 304 for the virtual hologram 122.

In an example, the data store 202 (or a different data store) may include stored therein selectable background image data in the form of still pictures, video, graphical presentations, animation, or any other form of visual information that may be desirable for display in the background 304 around a virtual hologram. For example, if the computing apparatus 300 is used in a video conferencing environment, rather than using the original background of a conference room, the render component 120 may include in the background 304 a video or still photograph of a mountain range, beach, cityscape, or other image data selected.

In another example, the interface component 302 may include a plurality of selectable options for alternating the vantage point from which the virtual hologram is rendered by the render component 120. For example, a selectable option may include a vantage point in which eye to eye contact is established between the virtual user and the second user adjacent the display screen 124. A selectable option may also include a vantage point in which the virtual hologram is facing forward and is gazing in a direction that is substantially normal to the display screen 124. A selectable option may also include a vantage point that shows the virtual hologram from a side or back view.

Figure 4:
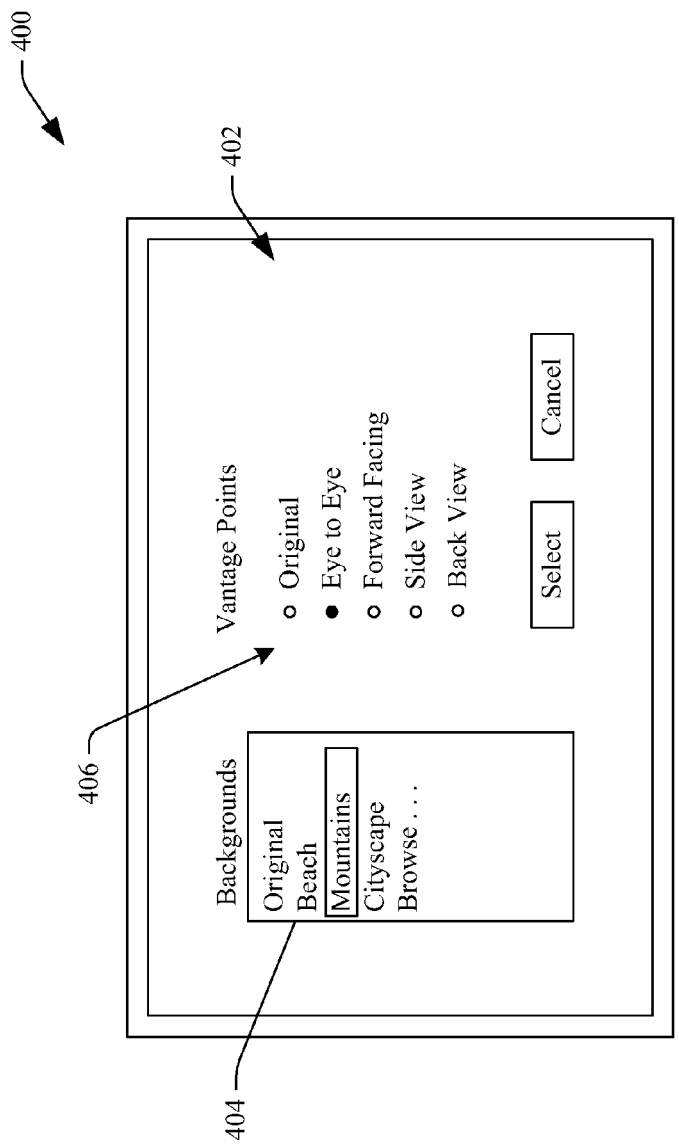
FIG. 4 is an exemplary graphical user interface that can be utilized in connection with selecting backgrounds and adjusting the rendering vantage point for a virtual hologram.

Referring now to FIG. 4, an exemplary graphical user interface 400 for selecting a background or alternative vantage point is illustrated. Here, the graphical user interface 400 may include a first window 402 that comprises a listing 404 of backgrounds to select, as well as a listing 406 of alternative vantage points to select.

Figure 5:
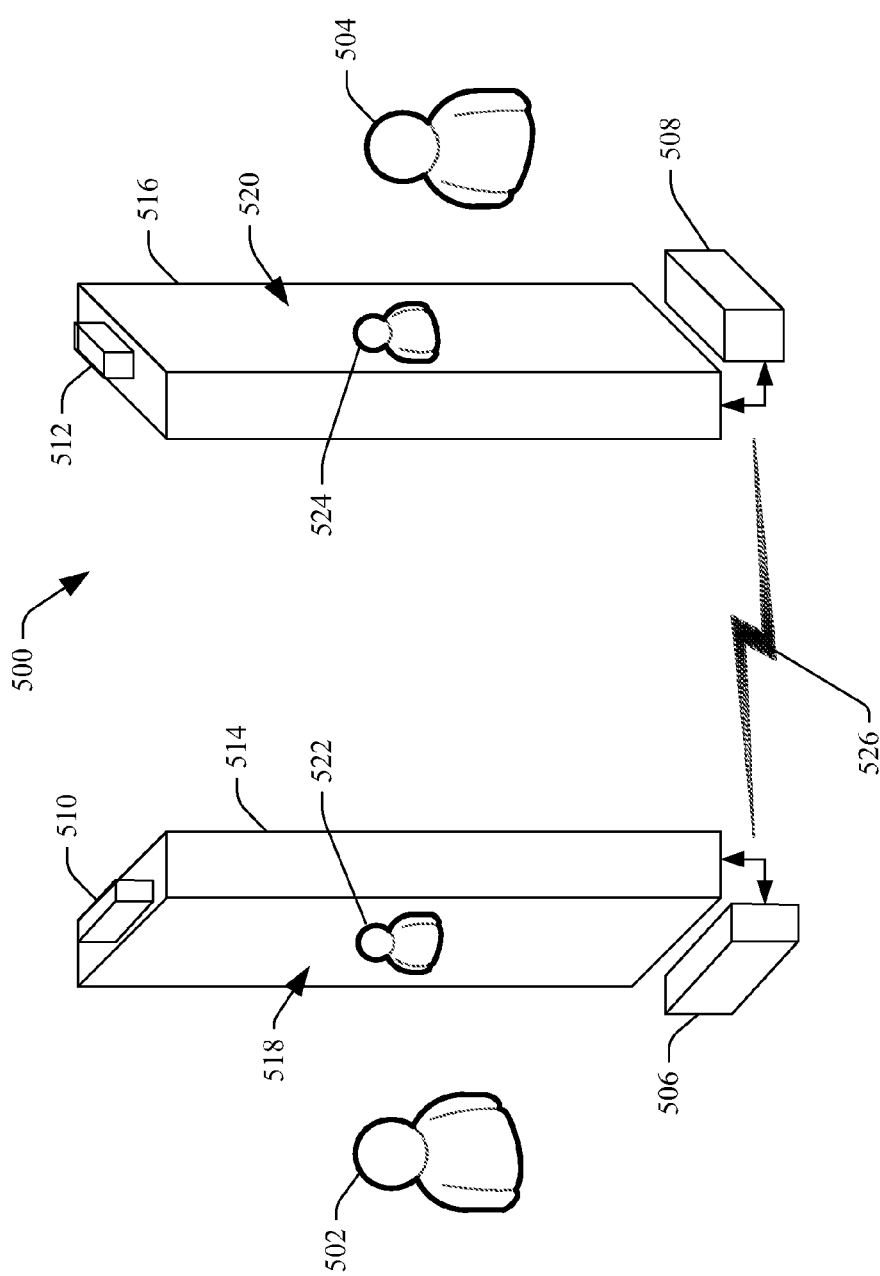
FIG. 5 is an exemplary depiction of two individuals carrying out a virtual chat in real time with virtual holograms corresponding to the individuals.

In a telepresence system, both the local and remote users may include a computing apparatus and a sensor unit. An example of this arrangement 500 is illustrated in FIG. 5. In this exemplary arrangement 500, a first local user 502 and a second remote user 504 may be having a video conference, may be playing a game, or may be participating in another activity in which video telepresence is desirable. For this arrangement, each location may include a computing apparatus 506, 508 in the form of a video gaming console, set top box, PC, laptop or other computing device. Communication between the commuting apparatuses 506, 508 may be carried out over a local or public network such as the Internet. This allows the individuals 502 and 504 to communicate with each other even if the individuals 502 and 504 are geographically separated from one another by a considerable distance.

In this example, each of the computing apparatuses 506 and 508 has sensor units 510 and 512, respectively, corresponding thereto. Also, each of the computing apparatus 506 and 508 are in communication with display screens 514, 516 on which video streams 518, 520 are displayed with virtual holograms 522, 524 of the other corresponding user.

Because each remote location includes a respective computing apparatus 506, 508, it should be appreciated that rendering of the digital holograms 522, 524 may be carried out at either or both computing apparatus. For example, the local computing apparatus 506 may include a receiver component that captures a stream of information from the local sensor device 510 and communicates this stream over a network 526 to the components of the remote computing apparatus 508 for processing and rendering a virtual hologram on the remote display screen 516. Alternatively, components of the local computing apparatus 506 may carry out rendering the video stream depicting the virtual hologram of the user 502, and such video stream may be communicated via the network 526 to the remote computing apparatus 508 for displaying on the remote display device 516.

In addition, using the information from the sensor units 510, 512, each computing apparatus 506, 508 may be capable of determining a position of each user relative to the display screens 514, 516, respectively. This determined position of each user may be used by the local or remote computing apparatus to select a vantage point for rendering a virtual hologram that orientates the virtual hologram to face the determined position of each respective user. Similarly, using the information from the sensor units 510, 512, each computing apparatus 506, 508 may be capable of determining a position of each user's eyes relative to a respective display screen 514,516. This determined position of each user's eyes may be used by the local or remote computing apparatus to select a vantage point for rendering a virtual hologram. Thus when the users gaze at each other's eyes on their respective display screens, the virtual holograms are orientated to enable the eyes of the virtual holograms to correctly gaze towards the determined position of the eyes of each respective user.

In additional, it should also be appreciated that telepresence may take place between more than two remote locations. In such cases, each respective computing apparatus may render a video stream for a local display device in which the virtual holograms for users at different remote locations appear to be collocated in a common room, or other location. Alternatively split screens may be presented on the display devices with different remote users in each split screen.

Also, it should be appreciated that in a particular location, multiple people may be captured in the field of view of a sensor unit. In such cases, the example computing apparatus may be capable of generating virtual holograms for each using respectively different alternative vantage points. For example, each virtual hologram in a common location could be rendered from points of view which have their respective eyes face in directions towards a determined position of the eyes of a common remote user.

In examples described herein, the described render component may include an algorithm that that maps 2-D color surface image data to a 3-D skeletal model for the virtual hologram using hardware-accelerated techniques available in a processor/GPU of the computing apparatus. Such hardware-accelerated techniques include parallax occlusion mapping, point splatting, or dynamic geometry tessellation of a height map.

Also, in an example, the 3-D skeletal model for the virtual hologram may be constructed in a manner that reduces the processing power needed to map surface image data. For example, an algorithm in the render component may generate a 3-D skeletal model by assembling cylinders and/or spheres for different body portions (limbs, torso, head, etc.) of the user. In a cylindrical case, each texel (color+depth) data for a point on the surface of the 3-D model may be described by the color and radial offset from a central axis of the 3-D surface at that point. Rendering each cylinder may be carried out in a similar manner as a planar algorithm, using polygonal decomposition into a mesh of individually planar triangles that approximate the cylindrical surface. For the spherical case, the radial offset for each texel is from a central point instead of an axis.

The render component may use an algorithm operative to smoothly blend joint seams to remove visual error. An exemplary algorithm may use pixel shading and bump or displacement mapping in this regard. In addition, the render component 120 may include an algorithm operative to project a sensor's 3-D geometric depth data and 2-D color video images (i.e., depth+color information) coming from a sensor's more planar projection view onto a persistent 3-D skeletal model assembled using a reverse ray-tracing. In this example, the cylinders of the 3-D skeletal model may be continuously animated by the render component 120 and progressively populated with information the sensor unit captures via the 2-D video cameras.

In prior examples, a single sensor unit has been illustrated in each location adjacent a display screen. However, it is to be understood that in alternative examples, multiple sensor units may be positioned around the room, all generally facing a user to be digitally rendered as a virtual hologram. In such an arrangement, the multiple depth+color data feeds from each sensor may be fused together, using known sensor orientations (from a prior calibration step that determines the relative spaced apart locations of the sensor units), into a single unified depth+color at time "T" buffer. The virtual hologram may be generated by the render component from the data in this buffer.

It should also be appreciated that because the virtual hologram is rendered from a 3-D skeletal model in 3-D space, the render component may also relight the virtual hologram to both remove natural light cues from the captured scene and add new lighting cues to match the new virtual scene. In this example the render component 120 or another component may create a map of environmental projection of the lighting detected in a scene, effectively estimating light sources and shadow-casting contributors. Artificial lighting information may then be added to correspond to virtual lights in the rendered scene in which the virtual hologram is depicted. Such lighting may be user selected via the previously described interface component. Further, such lighting may be dynamic and change responsive to changes in the user selected background or other user selected preferences. Also, in this example the render component 120 may use an algorithm for relighting which recovers and smoothes the normal, bi-normal, and tangent vectors from the raw depth data in the manner in which the virtual hologram data is progressively accumulated and smoothed for noise.

Figure 6:
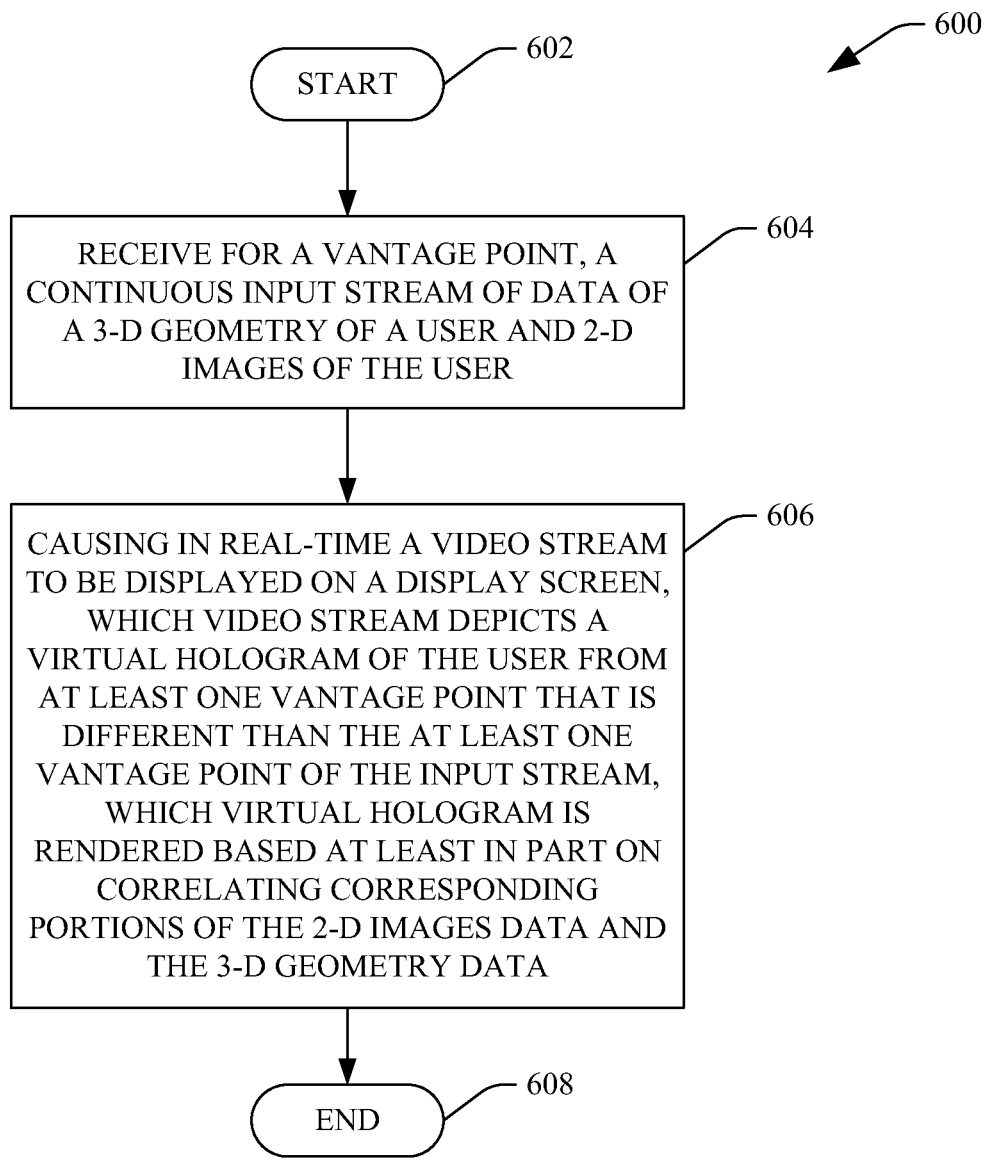
FIG. 6 is a flow diagram that illustrates an exemplary methodology for rendering a virtual hologram of a user with viewer perspective adjustment.
Figure 7:
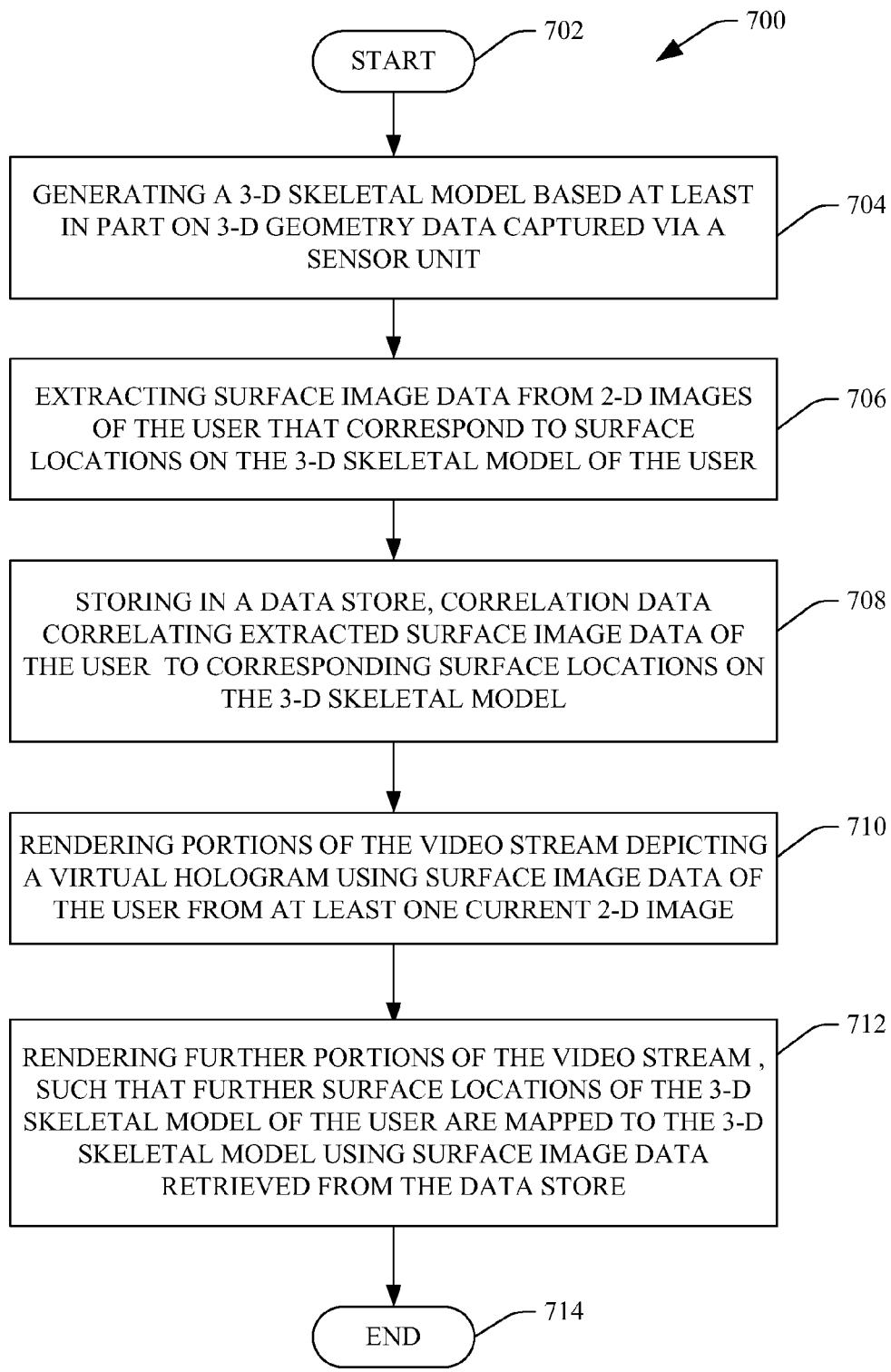
FIG. 7 is a flow diagram that illustrates an exemplary methodology for rendering a virtual hologram by mapping surface image data to a 3-D skeletal model of a user from historically cached data.

With reference now to FIGS. 6-7, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, a program, a thread of execution, and/or the like. Still further, results of acts of the methodologies may be stored in a computer-readable medium, displayed on a display device, and/or the like. The computer-readable medium may be a non-transitory medium, such as memory, hard drive, CD, DVD, flash drive, or the like.

Referring now to FIG. 6, a methodology 600 that facilitates carrying out telepresence with viewer perspective adjustment is illustrated. The methodology 600 begins at 602, and at 604 for at least one vantage point of a sensor unit, a continuous input stream of data is received from the field of view of the sensor unit. The input stream data is indicative of a 3-D geometry of a user captured using a depth sensor of the sensor unit. The input stream data is also indicative of 2-D images of the user captured using a video camera of the sensor unit.

At 606, a video stream is caused to be displayed on a remote display screen. The video stream depicts a virtual hologram of the user from at least one vantage point that is different than the at least one vantage point of the input stream. Also, the virtual hologram is rendered based at least in part upon correlating corresponding portions of the 2-D images data and the 3-D geometry data. In an example, the video stream depicting the virtual hologram may be rendered from a vantage point based at least in part on a determined location of the eyes of a second user relative to the display screen. The methodology 600 completes at 608.

With reference now to FIG. 7, an exemplary methodology 700 that facilitates rendering a virtual hologram is illustrated. The methodology 700 starts at 702, and at 704 a 3-D skeletal model is generated based at least in part on 3-D geometry data received from a depth sensor of a sensor unit.

At 706, surface image data is extracted from 2-D images of the user that correspond to surface locations on the 3-D skeletal model of the user. The 2-D images of the user are captured by a color video camera of the sensor unit.

At 708, correlation data is stored in a data store that correlates surface image data of the user extracted from the 2-D images to corresponding surface locations on the 3-D skeletal model. At 710, portions of the video stream depicting the virtual hologram is rendered such that surface image data of the user from at least one current 2-D image is mapped to corresponding surface locations on the 3-D skeletal model. At 712, further portions of the video stream are rendered, such that further surface locations of the 3-D skeletal model of the user from at least one different vantage point that are not depicted in at least one current 2-D image of the user, are mapped to the 3-D skeletal model using surface image data retrieved from the data store that were previously stored in correlated relation with the further surface locations of the 3-D skeletal model of the user. The methodology 700 completes at 714.

Figure 8:
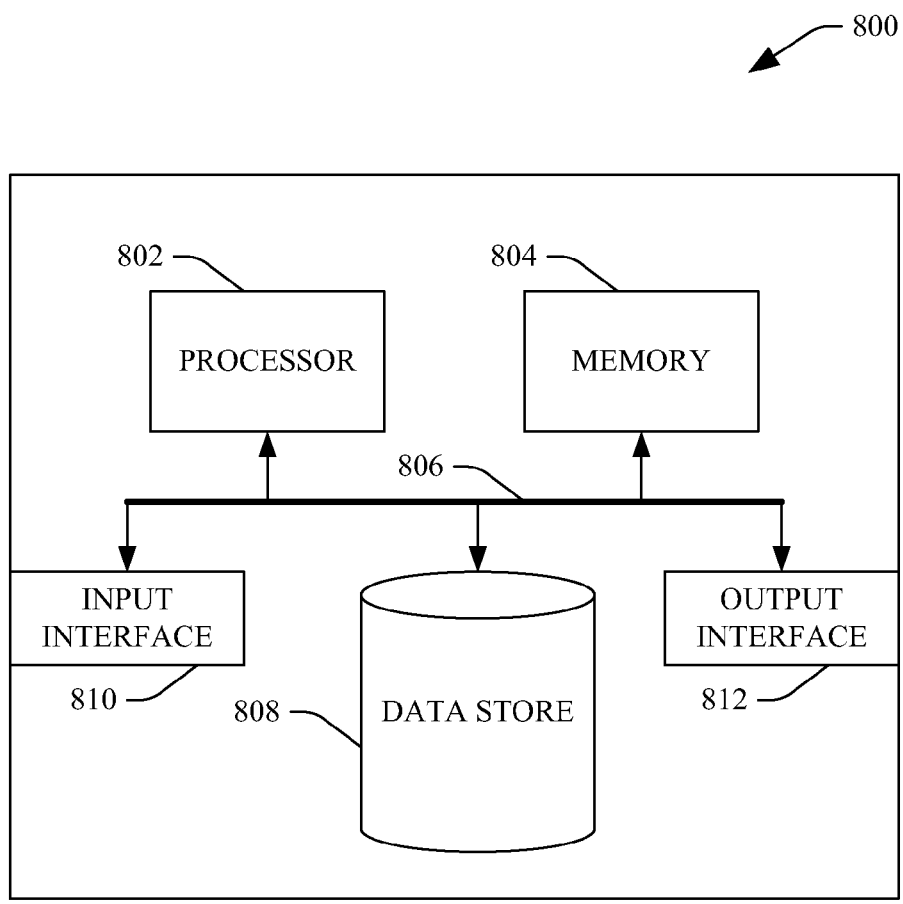
FIG. 8 is an exemplary computing system.

Now referring to FIG. 8, a high-level illustration of an exemplary computing device 800 that can be used in accordance with the systems and methodologies disclosed herein is illustrated. For instance, the computing device 800 may be used in a system carries out telepresence in which a virtual hologram of a user is rendered from a vantage point in real-time that is different than the vantage point that the user was originally captured via a sensor unit. In another example, at least a portion of the computing device 800 may be used in a system that supports video conferencing, video chat, and/or online gaming where telepresence is desired.

The computing device 800 includes at least one processor 802 that executes instructions that are stored in a memory 804. The memory 804 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store a 3-D skeletal model, surface image data cache, a plurality of selectable options to render a virtual hologram of a user, etc.

The computing device 800 additionally includes a data store 808 that is accessible by the processor 802 by way of the system bus 806. The data store may be or include any suitable computer-readable storage, including a hard disk, memory, etc. The data store 808 may include executable instructions, cashed correlations between surface imaged data and respective surface locations on a 3-D skeletal model, selectable backgrounds, and user selectable vantage points for rendering virtual holograms. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, video, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
   receiving, for a vantage point, a continuous input stream of data, the continuous input stream of data comprising three-dimensional (3-D) geometry data and two-dimensional (2-D) images of a user, the 3-D geometry data being indicative of 3-D geometry of a face of the user; and
   causing a video stream to be displayed on a display screen remotely located from the user to depict, in real-time, motion of the user, wherein the video stream depicts a 3-D image of the user from another vantage point that is different than the vantage point of the input stream, the 3-D image is rendered based at least in part upon:
   generating a 3-D skeletal model of the user based upon the 3-D geometry data;
   mapping portions of the 2-D images to respective locations of the 3-D skeletal model; and
   for at least one surface location of the 3-D skeletal model that fails to have a corresponding portion in the 2-D images mapped thereto, mapping cached 2-D image data to the at least one surface location, the cached 2-D image data being from a previously captured 2-D image of the user.

2. The method of claim 1, wherein the display is a 3-D display, further comprising:
   rendering the video stream depicting the 3-D image from two stereoscopic vantage points capable of producing the 3-D image through the display.

3. The method of claim 1, further comprising:
   receiving a selection of a background from a plurality of cached backgrounds;
   causing the video stream to include the background together with the 3-D image.

4. The method of claim 1, wherein a graphical processing unit is configured to use pixel shading to bump map the 2-D image data to a 3-D skeletal model of the user generated from the 3-D geometry data.

5. The method of claim 1, further comprising:
   receiving the input stream from a sensor unit, wherein the sensor unit has a depth sensor that is configured to output the 3-D geometry data of the user, wherein the sensor unit has a 2-D video camera operative to capture the 2-D images of the user.

6. The method of claim 5, further comprising:
   calibrating at least two spaced apart sensor units to determine their relative locations;
   receiving the input stream from the at least two spaced apart sensor units; and
   rendering the 3-D image based at least in part upon the input stream from the at least two sensor units and the relative locations of the sensor units.

7. The method of claim 1, wherein the user is at a first location, further comprising:
   receiving, at a second location and for at least one vantage point, a continuous input stream of data that comprises second 3-D geometry data and 2-D images of a second user, the second 3-D geometry data being indicative of 3-D geometry of a face of the second user, wherein the second location is remote from the first location; and
   causing a video stream to be displayed on a display screen in real-time at the first location, wherein the video stream depicts a second 3-D image of the second user from at least one vantage point that is different than the at least one vantage point of the input stream of data for the second user.

8. The method of claim 1, further comprising:
   rendering a plurality of 3-D cylinders that virtually represent a plurality of different body portions of the user based at least on part on correlating corresponding portions of the 2-D image data and the 3-D geometry data associated with each respective body portion of the user; and
   rendering the 3-D image of the user from the 3-D cylinders, including smoothly blending joint seams between adjacently located 3-D cylinders.

9. The method of claim 1, wherein the input stream further comprising:
   second data that is indicative of 3-D geometry of a second user; and 2-D images of the second user; the method further comprising:
   displaying on the display screen the 3-D image associated with the user and a second 3-D image associated with the second data, wherein the second 3-D image is rendered to be positionally adjusted in accordance with a determined eye location of the viewer to facilitate virtual eye-to-eye contact between the second user and the viewer.

10. The method of claim 1, further comprising:
   determining, as a function of positionally adjusting the 3-D image, a body portion of the user that is not in a field of view of a sensor capturing the input stream of data for the vantage point, wherein the body portion corresponds to a gap between the 3-D image and an edge of the display screen;
   generating, based on a 3-D skeletal model of the user, a 3-D image of the body portion of the user that is not in the field of view; and
   supplementing the 3-D image with the 3-D image of the body portion of the user that is not in the field of view.

11. The method of claim 1, further comprising adjusting presentation of the 3-D image of the user on the display by removing a natural light cue in the 2-D images and adding artificial lighting to at least one of the 2-D images or the 3-D geometry facilitating virtual lighting of the 3-D image.

12. The method of claim 1, the another vantage point being a function of a determined location of an eye of a viewer viewing the display screen, and the 3-D image is rendered to be positionally adjusted in accordance with the determined eye location of the viewer to facilitate virtual eye-to-eye contact between the user and the viewer.

13. A computing apparatus, comprising:
   a processor; and
   a memory that comprises components that are executable by the processor, the components comprising:
      a receiver component that receives, for a vantage point, a continuous input stream of data that comprises three-dimensional (3-D) geometry data and two-dimensional (2-D) images of a user, the 3-D geometry data indicative of 3-D geometry of a face of the user; and
      a render component that causes a video stream to be displayed on a display screen, wherein the video stream depicts a 3-D image of the user from another vantage point that is different than the vantage point of the input stream, the another vantage point being a function of a determined location of an eye of a viewer viewing the display screen, and the 3-D image is rendered to reflect real-time movement of the user based at least in part upon correlating corresponding portions of the 2-D images and the 3-D geometry data, the 3-D image is rendered to be positionally adjusted in accordance with the determined eye location of the viewer to facilitate virtual eye-to-eye contact between the user and the viewer, the 3-D image rendered based at least in part upon a cached 2-D image and correspondence between the cached 2-D image and the 3-D geometry data.

14. The computing apparatus of claim 13, further comprising:
   a data store, wherein the components further comprise:
   a correlation component, wherein the correlation component generates and stores in the data store correlation data correlating surface image data of the user extracted from the 2-D images to corresponding surface locations on a 3-D skeletal model of the user generated from the 3-D geometry data, wherein the render component renders portions of the video stream depicting the 3-D image such that surface image data of the user from at least one current 2-D image is mapped to corresponding surface locations on the 3-D skeletal model, and wherein the render component renders the video stream such that further surface locations of the 3-D skeletal model of the user from the at least one different vantage point that are not depicted in at least one current 2-D image are mapped to the 3-D skeletal model using surface image data retrieved from the data store that were previously stored in correlated relation with the further surface locations of the 3-D skeletal model of the user.

15. The computing apparatus of claim 13, wherein the render component renders the video stream depicting the 3-D image from the another vantage point based at least in part on a determined position of a second user relative to the display screen.

16. The computing apparatus of claim 13, wherein the render component renders the video stream depicting the 3-D image from two stereoscopic vantage points capable of producing the 3-D image through a 3-D image displaying display screen.

17. The computing apparatus of claim 13, wherein the components further comprise:
   a data store that stores a plurality of backgrounds;
   an interface component that receives a selection from the viewer of a background from amongst the plurality of backgrounds, wherein the render component causes the video stream to include the background together with the 3-D image such that the 3-D image is presented with the background which is not included in the input stream.

18. The computing apparatus of claim 13 being a video game console.

19. The computing apparatus of claim 13, further comprising:
   a sensor unit, wherein the sensor unit comprises a depth sensor that is configured to capture the 3-D geometry data, wherein the sensor unit comprises a 2-D video camera operative to capture the 2-D images of the user.

20. A video game console comprising a computer-readable medium, the computer-readable medium comprising instructions that, when executed by a processor, cause the processor to perform acts comprising:
   receiving, for a first vantage point, a continuous input stream of data that comprises three-dimensional (3-D) geometry data and two-dimensional (2-D) images of a first user, the 3-D geometry data indicative of 3-D geometry of a face of the first user, wherein the first user is at a first location;
   determining a position of an eye of a second user relative to a display screen being viewed by the second user, wherein the display screen is located in a second location that is remote from the first location;
   displaying a video stream on the display screen that depicts motion of the face of the first user in real-time, wherein the video stream depicts a 3-D image of the first user from a second vantage point that is different than the first vantage point of the input stream and that is chosen at least in part on the determined location of the eye of the second user, the 3-D image is rendered to be positionally adjusted in accordance with the determined eye location of the second user to facilitate virtual eye-to-eye contact between the first user and the second user based at least in part on correlating corresponding portions of the 2-D images and the 3-D geometry data, the 3-D image further rendered based upon cached image data of the user.

* * * * *